United States Patent [19]
Hamblin et al.

[11] Patent Number: 6,135,870
[45] Date of Patent: Oct. 24, 2000

[54] MOUNTING ASSEMBLY FOR DETACHABLY SUPPORTING STUFFING TUBES ON SAUSAGE ENCASING MACHINES

[75] Inventors: David S. Hamblin, Norwalk; Kenneth L. Lebsack, Ankeny, both of Iowa

[73] Assignee: Townsend Engineering Company, Des Moines, Iowa

[21] Appl. No.: 09/298,028

[22] Filed: Apr. 22, 1999

[51] Int. Cl.⁷ .................................................. A22C 11/00
[52] U.S. Cl. ............................................................. 452/45
[58] Field of Search .................................. 452/45, 35, 36, 452/33

[56] References Cited

U.S. PATENT DOCUMENTS

| | | | |
|---|---|---|---|
| 888,305 | 5/1908 | Bussinger | 452/45 |
| 2,660,755 | 12/1953 | Zaenkerf | 452/45 |
| 3,949,446 | 4/1976 | Smith | 452/45 |
| 3,952,370 | 4/1976 | Greider | 452/45 |

*Primary Examiner*—Willis Little
*Attorney, Agent, or Firm*—Zarley, McKee, Thomte, Voorhees & Sease

[57] ABSTRACT

A stuffing tube mounting assembly has an elongated cylindrical barrel with a longitudinal center axis and forward and rearward ends. The barrel has a first barrel portion at the rearward end, a second barrel portion at the forward end, and an intermediate barrel portion in between the first and second barrel portions. The first and second barrel portions have outer surfaces concentric with the longitudinal center axis. The intermediate barrel portion has an outer surface with a center axis parallel to but eccentrically offset from the longitudinal center axis. A hollow elongated stuffing horn has a rearward end detachably telescopically mounted on the second barrel portion. A hollow collar has a longitudinal bore extending therethrough comprised of an eccentric bore portion and a concentric bore portion. The concentric bore portion extends around and embraces the rearward end of the stuffing tube mounted on the second barrel portion of the barrel. The eccentric bore portion has an inner surface with a center axis parallel to but eccentrically offset from the longitudinal axis. It rotatably embraces the outer surface of the intermediate barrel portion so that when the collar is rotated in a direction to disalign the center axes of the intermediate barrel of the barrel portion and the eccentric bore portion of the collar, the concentric bore portion of the collar will forcibly bear against the rearward end of the stuffing tube and bind it against the outer surface of the second barrel portion of the barrel.

11 Claims, 4 Drawing Sheets

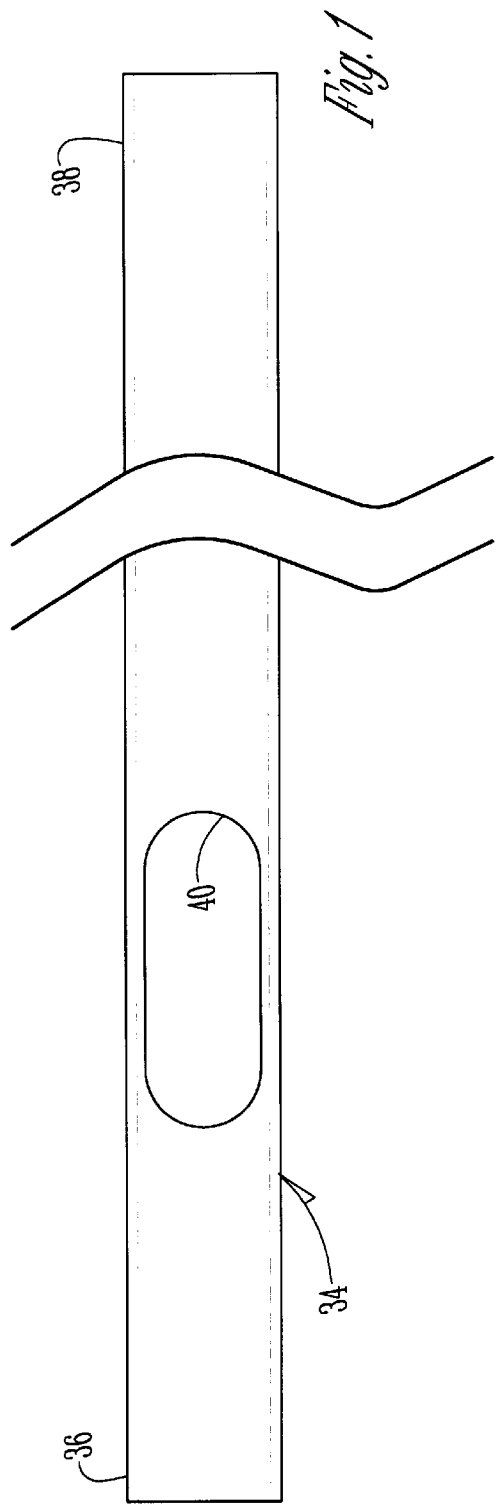
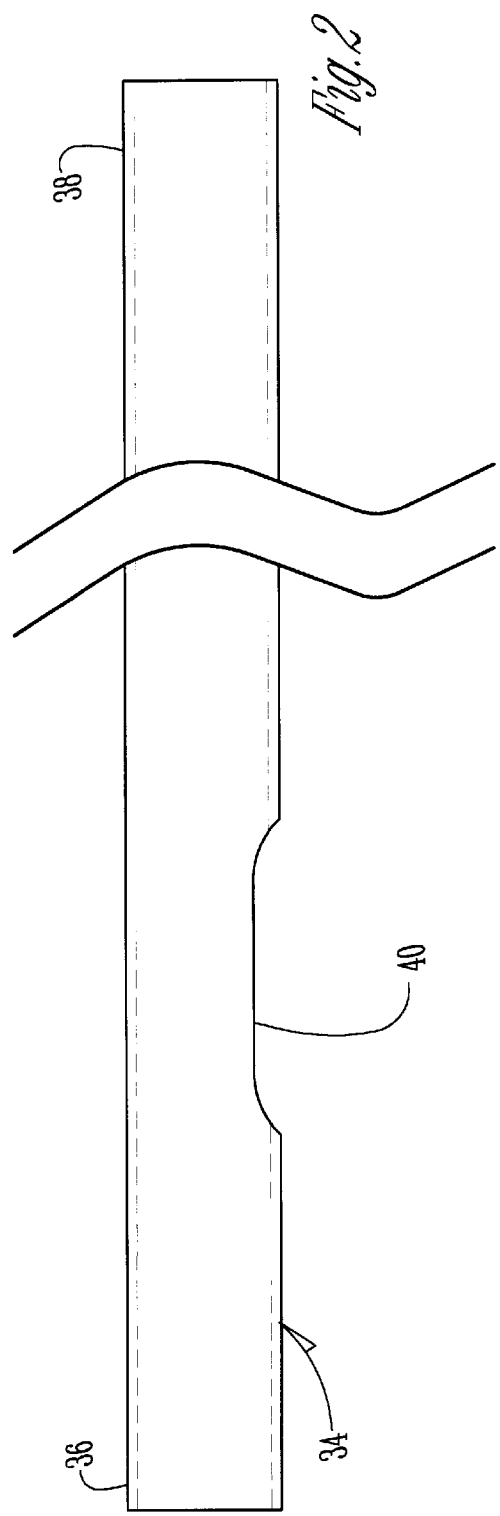

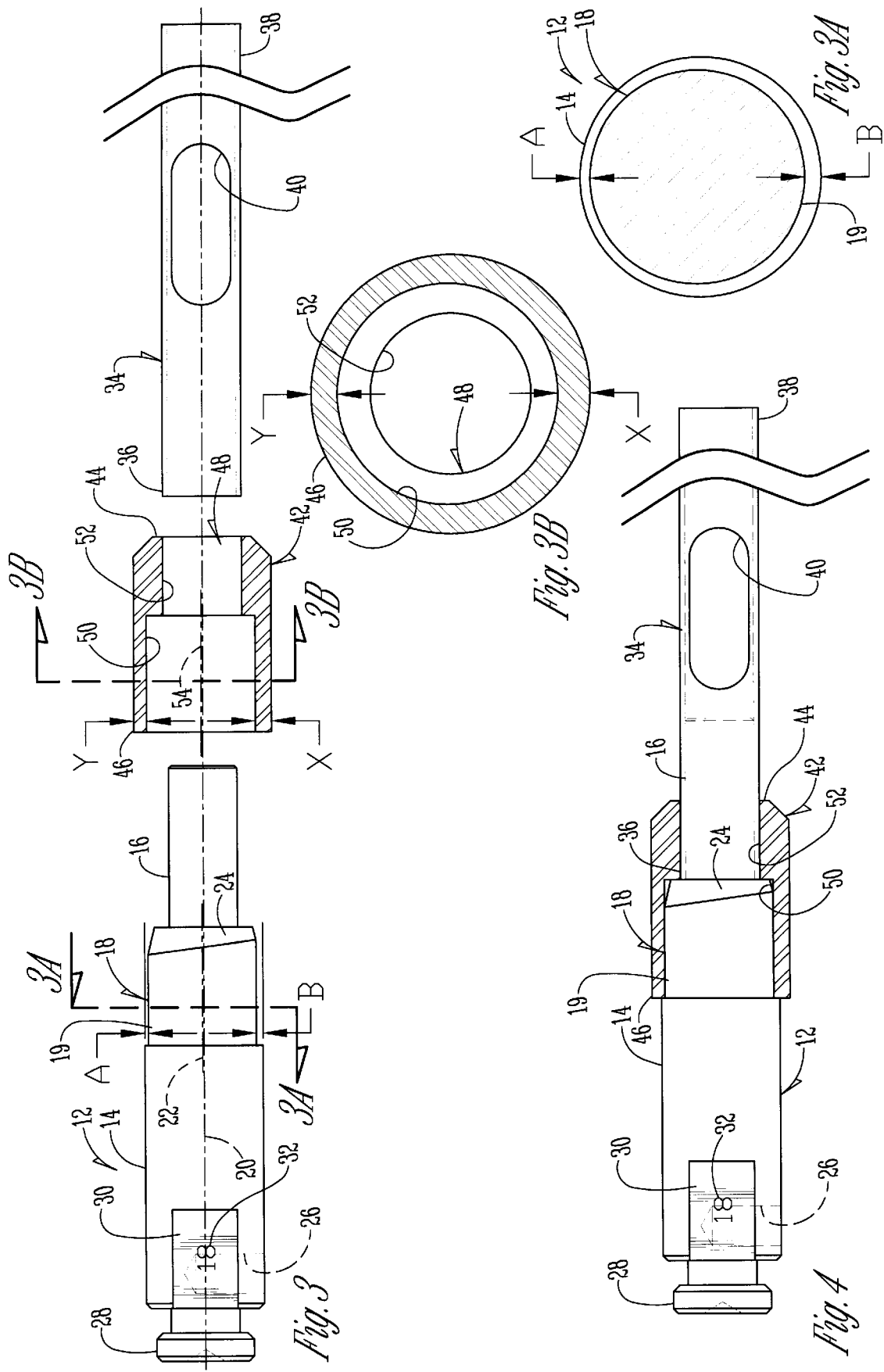

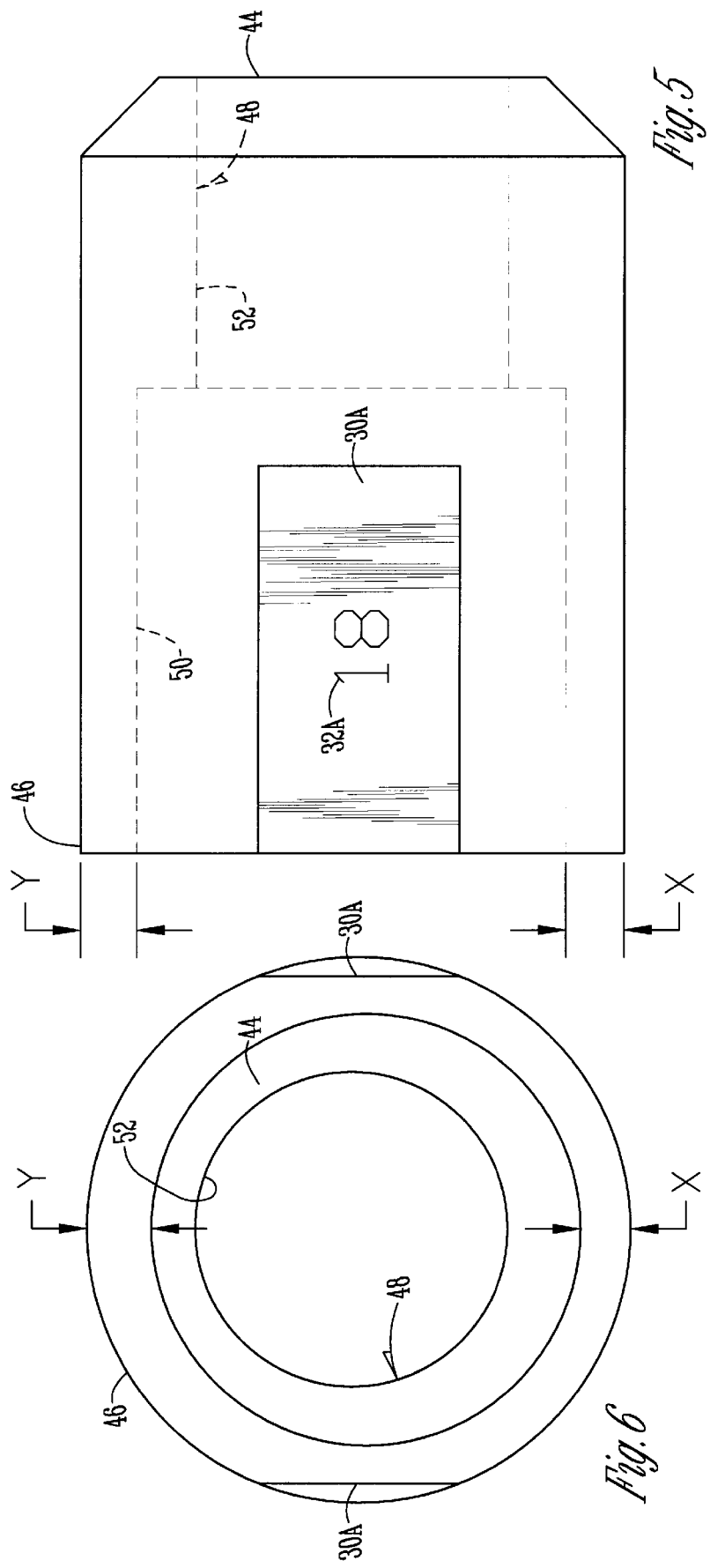

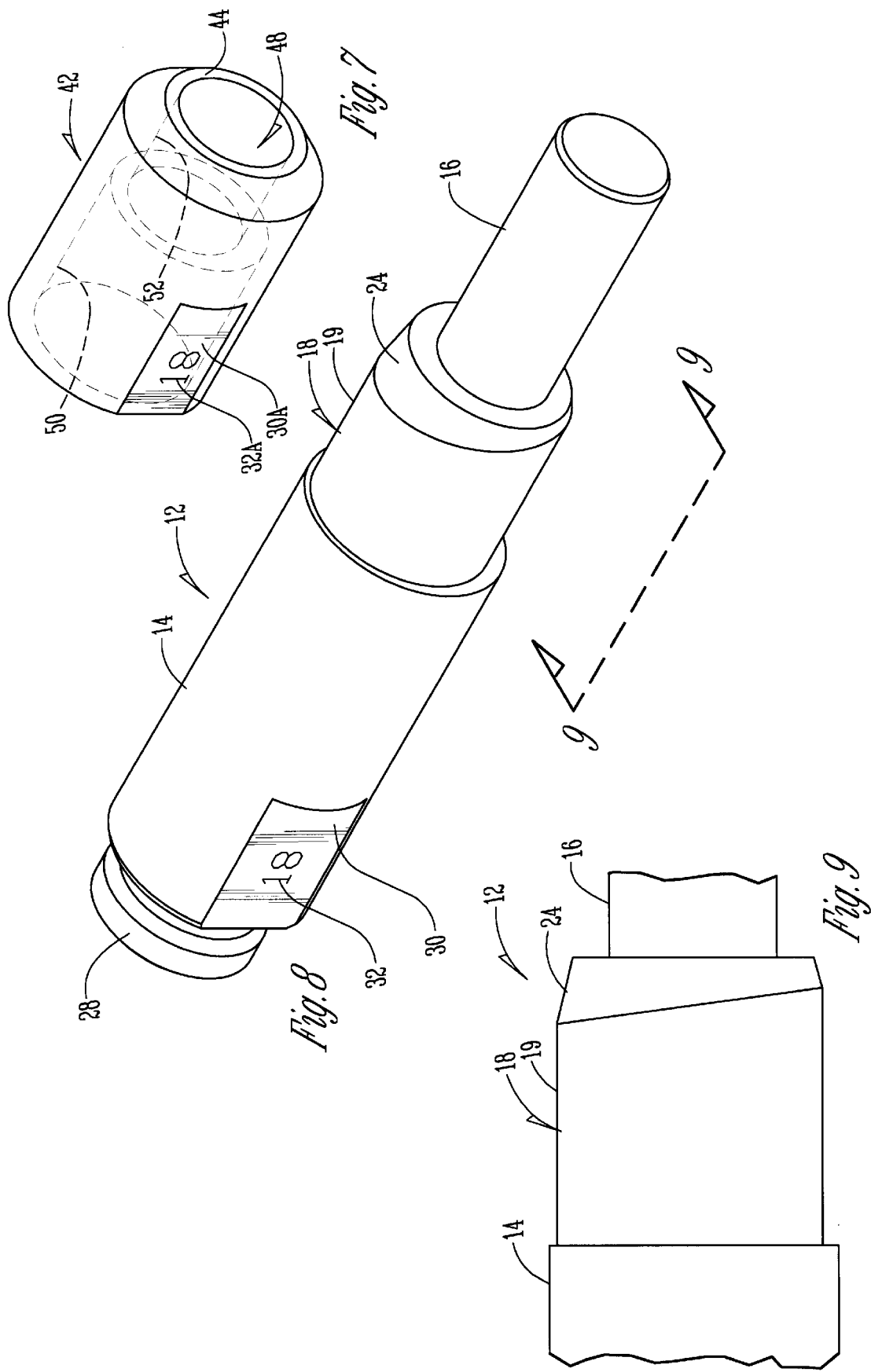

MOUNTING ASSEMBLY FOR DETACHABLY SUPPORTING STUFFING TUBES ON SAUSAGE ENCASING MACHINES

BACKGROUND OF THE INVENTION

Elongated hollow stuffing tubes are an integral part of all modern sausage encasing machines. They serve as the conduit upon which a hollow elongated casing material is mounted and through which meat emulsion is pumped for delivery into the casing.

These stuffing tubes are conventionally mounted on a solid elongated cylindrical stuffing tube end. The rearward end of the tube is slidably inserted over a protruding cylindrical portion of the stuffing tube end. The two components are then rigidly secured together by a stuffing tube pin that extends completely through the two components and is welded into position. This pin permanently secures the stuffing tube to the stuffing tube end.

The principal shortcoming of the foregoing structure is that if the stuffing tube is bent or otherwise damaged, not only must the stuffing tube be discarded, but the machined stuffing tube end to which it is rigidly attached must also be thrown away.

Another shortcoming of the foregoing structure is that cleaning of the stuffing tube is made more difficult by reason of its rigid attachment to the stuffing tube end.

It is therefore a principal object of this invention to provide a mounting assembly for stuffing tubes on sausage encasing machines wherein the stuffing tube is detachably secured to the stuffing tube end or barrel.

A further object of this invention is to provide a mounting assembly for stuffing tubes on sausage encasing machines wherein the stuffing tube can be easily detached from the stuffing tube end or barrel to facilitate cleaning.

These and other objects will be apparent to those skilled in the art.

SUMMARY OF THE INVENTION

A stuffing tube mounting assembly has an elongated cylindrical barrel with a longitudinal center axis and forward and rearward ends. The barrel has a first barrel portion at the rearward end, a second barrel portion at the forward end, and an intermediate barrel portion in between the first and second barrel portions. The first and second barrel portions have outer surfaces concentric with the longitudinal center axis. The intermediate barrel portion has an outer surface with a center axis parallel to but eccentrically offset from the longitudinal center axis.

A hollow elongated stuffing horn has a rearward end detachably telescopically mounted on the second barrel portion.

A hollow collar has a longitudinal bore extending therethrough comprised of an eccentric bore portion and a concentric bore portion. The concentric bore portion extends around and embraces the rearward end of the stuffing tube mounted on the second barrel portion of the barrel.

The eccentric bore portion has an inner surface with a center axis parallel to but eccentrically offset from the longitudinal axis. It rotatably embraces the outer surface of the intermediate barrel portion so that when the collar is rotated in a direction to disalign the center axes of the intermediate barrel of the barrel portion and the eccentric bore portion of the collar, the concentric bore portion of the collar will forcibly bear against the rearward end of the stuffing tube and bind it against the outer surface of the second barrel portion of the barrel.

BRIEF DESCRIPTION OF THE DRAWINGS

FIG. 1 is a side elevational view of the stuffing tube of this invention;

FIG. 2 is a top plan view of the stuffing tube of FIG. 1;

FIG. 3 is an exploded view of the components of the stuffing tube mounting assembly;

FIG. 3A is an enlarged scale sectional view taken on line 3A—3A of FIG. 3;

FIG. 3B is an enlarged scale sectional view taken on line 3B—3B of FIG. 3;

FIG. 4 is a sectional view of the assembled components of FIG. 3;

FIG. 5 is an enlarged scale side elevational view of the collar of this invention;

FIG. 6 is an end elevational view as seen from the lefthand end of FIG. 5;

FIG. 7 is a perspective view of the collar;

FIG. 8 is a perspective view of the barrel; and

FIG. 9 is a partial side elevational view of the barrel taken on line 9—9 of FIG. 8.

DESCRIPTION OF THE PREFERRED EMBODIMENT

The numeral 10 designates the mounting assembly which is shown in exploded form in FIG. 3 and in assembled form in FIG. 4. The mounting assembly includes a first component which is a barrel 12 comprised of first barrel portion 14, second barrel portion 16, and intermediate barrel portion 18. As best seen in FIGS. 3 and 8, the first barrel portion 14 has a diameter greater than that of the intermediate barrel portion 18 which in turn has a diameter greater than the second barrel portion 16. The intermediate barrel portion 18 has an eccentric outer surface 19 which will be discussed hereafter. The barrel 12 has a longitudinal center axis 20 and the intermediate barrel portion 18 has a center axis 22 which is offset from the center axis 20 as best shown by the dimensional lines "a" and "b" shown in FIG. 3. The forward end of intermediate barrel portion 18 has a chamfered or beveled edge 24.

The barrel 12 has a conventional hole 26 for receiving an anti-rotation pin (not shown). It also has a conventional knob 28 which is adapted to receive the end of the piston of an air cylinder for moving the mounting assembly 10 in a longitudinal direction. A flat wrench gripping surface 30 is imposed on opposite sides of the rearward end of barrel 12 to receive an end wrench or the like. An indicia mark 32 is imposed on one of the gripping surfaces 30.

A conventional stuffing tube 34 has a rearward end 36 and a forward end 38. A conventional oblong meat emulsion port 40 is located in the side of the stuffing horn to receive meat emulsion.

A collar 42 has a forward end 44 and a rearward end 46, and a bore 48 extended therethrough. Bore 48 is comprised of a rearward eccentric bore portion 50 and a forwardly concentric bore portion 52. Bore portion 52 is concentric in that it is centered on the longitudinal center axis 20 of barrel 12. Eccentric bore portion 50 has a center or offset axis 54 in that it is offset from center axis 20 as shown by the dimension lines "x" and "y" in FIG. 3. The collar 42 has flat wrench gripping surfaces 30A similar to the previously described surfaces 30. It also has an indicia mark 32A on one surface 30A similar to the indicia mark 32 previously described.

To mount the stuffing tube 34 on the barrel 12, the rearward end 36 of the stuffing tube 34 is slidably mounted on the second barrel portion 16 of the barrel 12. This places the stuffing tube 34 in concentric position on the barrel portion 16 all in alignment with the center longitudinal axis 20 of the barrel.

The collar 42 is then slidably mounted on the forward end 38 of the stuffing tube 34 and moved into the position shown in FIG. 4 wherein the rearward end 46 of the collar is moved over the outer surface of the intermediate barrel portion 18. It should be remembered that the barrel portion 18 has an eccentric outer surface 19, which is received within the eccentric bore portion 50 of the collar 42. The collar 42 will only slidably embrace the portion 18 when rotated to a position wherein the eccentricity offset of the surface 19 complements the offset of the eccentric bore portion 50 of the collar. This condition exists only when axis 22 of barrel portion 18 is aligned with axis 54 of bore 50 of collar 42 and both axes 22 and 54 are aligned with axis 20 of barrel 12. This condition is shown in FIGS. 3 and 4, and can be visually ascertained when indicia marks 32 and 32A are aligned. The collar 42 is rotated on tube 34 to create the alignment before being moved onto surface 19 of portion 18. The marks 32 and 32A are aligned when the wrench gripping surfaces 30 and 30A are in parallel planar alignment. At this point in the assembly, the collar 42 has not yet firmly joined the barrel 12 and the stuffing tube 34.

With reference to FIGS. 3 and 4, it should be noted that meat emulsion port 40 is also in parallel planar alignment with the surfaces 30 and 30A upon which the indicia marks 32 and 32A appear when the axes 20, 22 and 54 of the barrel 12, the barrel portion 18 and the bore 50, respectively, are aligned. Thus, this location of the meat emulsion port 40 can also be of use in the assembly of the foregoing components when the collar 42 is placed in position on the stuffing tube before the final tightening step occurs.

The operator will then take an end wrench or the like and engage the gripping surfaces 30 on the rearward end of the barrel 12. A second wrench will be applied to the gripping surfaces 30A on the outer surface of the collar 42. The wrench on the collar 42 will then be used to rotate the collar 42 with respect to the barrel 12 to disalign the center axis 22 of the intermediate barrel portion 18 with the eccentric axis 54 of bore portion 50 of the collar. This will cause the concentric bore portion 50 of the collar to forcibly bear against the rearward end 36 of the stuffing tube and bind it against the outer surface of the second barrel portion 16 of the barrel 12. This operation rigidly connects the stuffing tube 34 to the barrel 12.

The stuffing tube 34 can be detachably removed from the barrel 12 by rotating the collar 42, with the help of wrenches, in the opposite direction in which the rotation occurred in assembling these components. Thus, the stuffing tube 34 can be easily and quickly removed from the barrel 12 for cleaning purposes. Also, if the stuffing tube 34 is damaged and must be replaced, it can be thrown away without discarding the barrel 12.

Thus, from the foregoing, it is seen that this invention will achieve at least all of its stated objectives.

What is claimed is:

1. A stuffing tube mounting assembly, comprising,
   an elongated cylindrical barrel having a longitudinal center axis and forward and rearward ends,
   a first cylindrical barrel portion comprising the rearward end,
   a second cylindrical barrel portion comprising the forward end,
   an intermediate cylindrical barrel portion in between the first and second barrel portions,
   the first and second barrel portions having outer surfaces concentric with the longitudinal center axis,
   the intermediate barrel portion having an outer surface with a center axis parallel to but eccentrically offset from the longitudinal center axis,
   a hollow elongated stuffing horn having a rearward end detachably telescopically mounted on the second barrel portion,
   a hollow collar having a longitudinal bore extending therethrough comprised of an eccentric bore portion and a concentric bore portion,
   the concentric bore portion extending around and embracing the rearward end of the stuffing tube mounted on the second barrel portion of the barrel,
   the eccentric bore portion having an inner surface with a center axis parallel to but eccentrically offset from the longitudinal axis and rotatably embracing the outer surface of the intermediate barrel portion so that when the collar is rotated in a direction to disalign the center axes of the intermediate barrel portion of the barrel and the eccentric bore portion of the collar, the concentric bore portion of the collar will forcibly bear against the rearward end of the stuffing tube and bind it against the outer surface of the second barrel portion of the barrel.

2. The mounting assembly of claim 1 wherein the outer diameter of the first barrel portion is greater than the outer diameter of the intermediate barrel portion.

3. The mount assembly of claim 1 wherein the outer diameter of the first barrel portion is greater than the outer diameter of the second barrel portion.

4. The mounting assembly of claim 1 wherein the outer diameter of the first barrel portion is greater than the outer diameter of the intermediate and second barrel portions.

5. The mounting assembly of claim 4 where the outer diameter of the second barrel portion is less than that of the first and intermediate barrel portions.

6. The mounting assembly of claim 2 wherein the intermediate barrel portion has an outer diameter greater than that of the second barrel portion.

7. The mounting assembly of claim 1 wherein rotation of the collar in an opposite direction will relieve the rearward end of the stuffing tube from binding engagement with the outer portion of the second barrel portion to permit the stuffing tube to be slidably removed therefrom.

8. The mounting assembly of claim 1 wherein the first barrel portion and the collar each have opposite parallel pairs of gripping surfaces to receive gripping wrenches to facilitate the rotation of the collar with respect to the barrel.

9. The mounting assembly of claim 8 wherein when the gripping surfaces are in parallel planar alignment, the axes of the eccentric bore portion of the collar and the intermediate barrel portion of the barrel are in alignment with each other and with the longitudinal center axis of the barrel.

10. The mounting assembly of claim 9 wherein an indicia mark is located on one each of the gripping surfaces of each of the collar and the intermediate barrel portion to facilitate their movement into a position of parallel planar alignment.

11. The mounting assembly of claim 10 wherein a meat emulsion port is located in the stuffing tube in parallel planar alignment with the gripping surfaces bearing the indicia marks when the axes of the eccentric bore portion of the collar and the intermediate barrel portion of the barrel are in alignment with each other and with the longitudinal center axis of the barrel in a manner that the indicia marks and the meat emulsion port are all simultaneously visible to an operator aligning the same.

* * * * *